US012561153B2

(12) United States Patent
Moss et al.

(10) Patent No.: US 12,561,153 B2
(45) Date of Patent: *Feb. 24, 2026

(54) SYSTEM FOR AUTOMATING PROCESSES

(71) Applicant: Blue Prism Limited, Warrington (GB)

(72) Inventors: David Moss, Stoke-on-Trent (GB);
Ciaran Gultnieks, Pateley Bridge (GB)

(73) Assignee: Blue Prism Limited, Warrington (GB)

( * ) Notice: Subject to any disclaimer, the term of this patent is extended or adjusted under 35 U.S.C. 154(b) by 211 days.

This patent is subject to a terminal disclaimer.

(21) Appl. No.: 18/156,897

(22) Filed: Jan. 19, 2023

(65) Prior Publication Data

US 2023/0153138 A1      May 18, 2023

Related U.S. Application Data

(63) Continuation of application No. 14/053,319, filed on Oct. 14, 2013, now Pat. No. 11,586,453.

(30) Foreign Application Priority Data

Jul. 5, 2013    (GB) ...................................... 1312151

(51) Int. Cl.
*G06F 9/455* (2018.01)
(52) U.S. Cl.
CPC .......... *G06F 9/45533* (2013.01); *G06F 9/455* (2013.01)
(58) Field of Classification Search
CPC ...... G06F 9/45533; G06F 9/455; G06Q 10/10
See application file for complete search history.

(56) References Cited

U.S. PATENT DOCUMENTS

| | | | |
|---|---|---|---|
| 6,256,637 | B1 | 7/2001 | Venkatesh et al. |
| 7,962,620 | B2 | 6/2011 | Safari et al. |
| 7,971,091 | B1 | 6/2011 | Bingham et al. |
| 8,826,068 | B2 | 9/2014 | Somendra |
| 9,292,466 | B1 | 3/2016 | Vincent |
| 10,469,572 | B2 | 11/2019 | Moss et al. |
| 2002/0147505 | A1 | 10/2002 | Beck et al. |
| 2004/0088717 | A1 | 5/2004 | Chen et al. |
| 2005/0138626 | A1 | 6/2005 | Nagami et al. |

(Continued)

FOREIGN PATENT DOCUMENTS

| | | |
|---|---|---|
| CN | 101430644 A | 5/2009 |
| JP | 2009-151467 A | 7/2009 |

(Continued)

OTHER PUBLICATIONS

Canadian Intellectual Property Office, Office Action, CA Patent Application No. 2,916,909, Dec. 2, 2021, four pages.

(Continued)

*Primary Examiner* — Wynuel S Aquino
(74) *Attorney, Agent, or Firm* — Fenwick & West LLP

(57) ABSTRACT

There is provided a system for automating processes, the system comprising at least one computer configured to provide at least one virtual user which interacts with applications and/or documents to run at least one automated process. There is also provided a method of running automated processes, the method comprising the steps of providing at least one computer and providing at least one virtual user on the at least one computer which interacts with applications and/or documents to execute at least one automated process.

22 Claims, 7 Drawing Sheets

(56)        References Cited

U.S. PATENT DOCUMENTS

| | | | |
|---|---|---|---|
| 2005/0149868 A1 | 7/2005 | Katayama et al. | |
| 2008/0163239 A1 | 7/2008 | Sugumar et al. | |
| 2010/0023517 A1 | 1/2010 | V. et al. | |
| 2010/0027896 A1 | 2/2010 | Geva et al. | |
| 2010/0257399 A1 | 10/2010 | Brown et al. | |
| 2011/0119388 A1 | 5/2011 | Attanasio et al. | |
| 2011/0289417 A1 | 11/2011 | Schaefer et al. | |
| 2012/0151063 A1 | 6/2012 | Yang et al. | |
| 2012/0151480 A1 | 6/2012 | Diehl et al. | |
| 2012/0174069 A1* | 7/2012 | Zavatone | G06F 11/3692 717/124 |
| 2012/0331342 A1 | 12/2012 | Behrendt et al. | |
| 2013/0041936 A1 | 2/2013 | Ohtake et al. | |
| 2013/0329023 A1 | 12/2013 | Suplee et al. | |
| 2014/0118239 A1 | 5/2014 | Phillips | |
| 2014/0181817 A1 | 6/2014 | Muller et al. | |
| 2014/0245115 A1 | 8/2014 | Zhang et al. | |
| 2014/0282978 A1 | 9/2014 | Lerner et al. | |
| 2014/0366005 A1* | 12/2014 | Kozhuharov | G06F 11/3668 717/125 |
| 2015/0012919 A1 | 1/2015 | Moss et al. | |
| 2015/0106463 A1 | 4/2015 | Kruglick | |
| 2016/0266918 A1 | 9/2016 | Ge et al. | |
| 2018/0159721 A1 | 6/2018 | Delcheva et al. | |
| 2019/0014175 A1 | 1/2019 | Malachowski et al. | |

FOREIGN PATENT DOCUMENTS

| | | | |
|---|---|---|---|
| JP | 2012-155219 A | 8/2012 | |
| JP | 2013-041352 A | 2/2013 | |

OTHER PUBLICATIONS

China National Intellectual Property Administration, Office Action, CN Patent Application No. 201480045821.5, Jul. 3, 2019, 14 pages.

Communication pursuant to Article 94(3) EPC for European Patent Application No. EP 14741937.8, Jun. 30, 2017, 7 Pages.

European Patent Office, Office Action, EP Patent Application No. 19204139.0, Feb. 28, 2022, eight pages.

Japan Patent Office, Notice of Reasons for Refusal, JP Patent Application No. 2018-194709, Apr. 7, 2020, six pages.

United States Office Action, U.S. Appl. No. 16/583,208, Aug. 19, 2020, 60 pages.

United States Office Action, U.S. Appl. No. 14/053,319, Apr. 5, 2017, 27 pages.

United States Office Action, U.S. Appl. No. 14/053,319, Dec. 14, 2017, 28 pages.

United States Office Action, U.S. Appl. No. 14/053,319, Feb. 26, 2016, 24 pages.

United States Office Action, U.S. Appl. No. 14/053,319, Feb. 8, 2019, 26 pages.

United States Office Action, U.S. Appl. No. 14/053,319, Jan. 23, 2020, 22 pages.

United States Office Action, U.S. Appl. No. 14/053,319, Jul. 16, 2018, 30 pages.

United States Office Action, U.S. Appl. No. 14/053,319, Jul. 24, 2020, 25 pages.

United States Office Action, U.S. Appl. No. 14/053,319, Jul. 27, 2015, 27 pages.

United States Office Action, U.S. Appl. No. 15/462,709, Feb. 8, 2019, 41 pages.

European Patent Office, Extended European Search Report and Opinion, European Patent Application No. 19204139.0, Aug. 4, 2025, 10 pages.

* cited by examiner

FONT IDENTIFIED BY USER ~702

CREATE 2D ARRAY FOR EACH CHARACTER ~704

CONVERT BITMAP OF IDENTIFIED REGION TO CANVAS ~706

SCAN CANVAS FOR CHARACTERS ~708

MATCH CHARACTER FROM CANVAS TO FONT ~710

MOVE PAST IDENTIFIED CHARACTER ~712

OUTPUT IDENTIFIED STRING ~714

SYSTEM FOR AUTOMATING PROCESSES

CROSS REFERENCE TO RELATED APPLICATIONS

This application claims priority of U.S. patent application Ser. No. 14/053,319 filed Oct. 14, 2013, which claims priority of GB Patent Application No. 1312151.2 filed Jul. 5, 2013, the entirety of each of which is incorporated herein by reference.

FIELD OF THE INVENTION

The present invention relates to the running of automated processes. More specifically, it relates to the use of virtual users for automating processes. That is, processes which are presently carried out by a manual transfer of information and commands from one system to another or within a single system, for example, may be replicated, using robotic automation, such that they are performed by one or more virtual users.

BACKGROUND OF THE INVENTION

It is often the case that expected, or unexpected, change requires a change in the way a business must operate. For example, the launch of a new product can require existing systems to be integrated, new regulation can require the recording of process steps or an acquisition can require the merging of two product lines and processes. Traditional enterprise system planning and rollout can absorb these issues; however, these planning cycles are designed for large projects, not supporting everyday operational change. As a result, changes are implemented at great cost and sometimes only over many years, as new systems replacing the func- tionality of the original systems and providing the required new functionality must be developed and require extensive testing and quality assurance before they can reliably be implemented. These systems must also be designed and configured by people with the required specialist skills in computer programming and application development. This adds more time to the development process since there are often relatively few people, if any, with the required skills within an organization and, once such systems are imple- mented, the time it takes for users of the original systems to become acquainted with the new systems can be long and the process is often characterized by inefficiency and inac- curacy.

The problem arises because back office business pro- cesses can often involve multiple independent and incom- patible software applications. Some of these software appli- cations may have application programming interfaces (APIs) which facilitate the transfer of information in or out of an application by providing a predefined interface through which another software application may interact; however this is not always the case. For example, many of the software applications used in these back office business processes are old applications designed without the features required to allow easy access by other software applications. Others are custom in-house software solutions created to serve a very specific purpose where the need to provide an interface through which other applications could interact was not foreseen. Traditionally, this is overcome by using operational staff to bridge the gap between these software applications. The use of operational staff is an expensive solution, since large numbers of operational staff may need to be employed to provide the capacity required. Since the gap between these incompatible software application or systems is bridged by a human, the process is typically slow since operational staff only work for part of the day, are limited by the speed at which they can input information or commands using a keyboard and mouse or any other inter- face and are limited by the speed at which they can read information from a screen or other output. Furthermore, humans are susceptible to errors in input of data or com- mands to a system and in reading information from another, which a computer is not. There also exists the possibility, when operational staff are used in such a manner, that malicious interference with processes, systems and data can occur.

For example, a telecoms provider may launch a new mobile phone handset which requires the use of existing software applications and new systems which may be incompatible. This shortfall is usually filled by operational staff, but often it is not possible to predict the demand for such newly launched products and so too many or too few staff are trained to use the software systems. It is, therefore, desirable to fill this gap between incompatible software systems with a solution which allows for rapid scaling to cope with demand, without requiring detailed knowledge of the demand up-front.

In such systems, large volumes of information, which may be sensitive personal information are often handled. It is also desirable to handle this information in a consistent manner which reduces the number of errors that may be associated with a human simply copying information from one system to another and it is also desirable to handle the information in a private and secure manner which is only accessible when absolutely necessary.

In another example, a bank operates a team of employees to review high risk customer accounts from which payments are due to be paid but which have insufficient funds. The employees use account profiles for each customer to make a decision to either return or process the payments. This arrangement requires that employees are permanently assigned away from customer facing roles. Also the high volumes of decisions take a considerable length of time to process, and the treatment of different customer accounts by different employees may be inconsistent and inaccurate.

These problems, which require operational staff to fill in where pre-existing software applications fall short of the functionality required for a new process to be implemented, are not unique to the business back office. For example, the reception of a hospital or doctor's surgery is often a busy environment with many patients arriving for appointments. Receptionists spend a lot of time carrying out routine tasks such as taking details from patients arriving for appoint- ments and inputting them into a software application which checks the patient in for their appointments. This process is often slow, can be inaccurate due to patient details being misheard and takes away the receptionists' time from car- rying out other duties.

It may be desirable to provide self-service check-in kiosks in the reception of the hospital or doctor's surgery which enable patients arriving to input their own details to the system so that inaccuracies are minimised, receptionists are free to deal with other tasks and waiting times are reduced. However, to provide a patient with the same interface as that provided to the receptionist may not be appropriate, since the software applications used by the receptionist is likely to have more advanced features that are unnecessarily confus- ing to the patient or the application may have administrative controls or access to information that it would be inappro- priate to provide to patients using a self-service check-in kiosk. Unless the existing receptionist application provides the capability for a new application which is run on the self-service kiosks to access certain functions and features, the same long planning cycles, expense, inefficiency and inaccuracy associated with change in back office business processes apply when new software applications and systems which provide the required functionality to implement these systems are developed. This often results in such projects never being undertaken.

It is an object of the present invention to overcome one or more of the above described problems.

SUMMARY OF THE INVENTION

In a first aspect of the invention there is provided a system for running automated processes. In a first embodiment, the system comprises at least one computer configured to provide at least one virtual user which interacts with applications and/or documents to run at least one automated process.

Preferably, the system further comprises a database accessible by the at least one automated process, wherein the at least one virtual user is configured to execute the at least one automated process utilising data stored in the database.

Preferably, the at least one computer is configured to host at least one virtual machine and the at least one virtual machine is configured to provide the at least one virtual user to execute the at least one automated process utilising data stored in the database.

Preferably, the at least one computer is configured to host at least one virtual machine and the system further comprises at least one database server and at least one application server and wherein the at least one virtual machine is communicatively coupled with the at least one database server and the at least one application server, the at least one application server is configured to provide instructions to the at least one virtual machine to execute the at least one automated process and the at least one virtual machine is configured to provide the at least one virtual user to execute the at least one automated process according to the provided instructions utilising data stored in the database.

Preferably, the at least one database server, at least one application server and at least one computer form a first set, and the system further comprises a second set of at least one database server, at least one application server and at least one computer, wherein the first and second sets are communicatively coupled such that the at least one application server of each set and the at least one database of each set may communicate with each other, at least one application server of one of the sets is configured to provide instructions to the at least one virtual machine of at least one of the first and second sets and the at least one database server of the second set is a mirror of the at least one database server of the first set.

Preferably, the at least one application server of at least one set is configured to manage the connection of the at least one virtual machine of the at least one set to the one or more database servers of the at least one set.

Preferably, the at least one application server of the at least one set contains database server credentials for securely accessing the at least one database server of the at least one set.

Preferably, the at least one virtual machine/virtual user comprises more than one virtual machine/virtual user, and the virtual machines/virtual users are grouped into at least one resource pool.

Preferably, the second set is inactive until activated upon failure of the first set.

Preferably, the at least one virtual machine is configured such that remote access is limited to providing instructions to execute automated processes, shutdown the at least one virtual machine, restart the at least one virtual machine and start up the at least one virtual machine.

Preferably the at least one virtual machine is further configured to carry out the automated processes by interacting with one or more of: an accessibility interface, an exposed API and the presentation technology of an operating system.

Preferably, the at least one virtual machines is further configured to carry out the automated processes by interpreting HTML elements within a HTML document.

Preferably, the at least one virtual machine is configured to carry out the at least one automated process by identifying the font used by the text in a defined region of the user interface and identifying the characters of the text in the defined region of the user interface using the identified font.

Preferably, the automated processes are defined by a user and configured to be carried out on data from one or more of software systems, databases or stored files or documents.

Preferably, at least one password required to access specific software applications is stored within an encrypted credential store on the at least one database server.

Preferably, at least one virtual machine is configured to update the at least one password stored within the encrypted credential store to a random password not known outside the system.

In a second aspect of the invention there is provided a method for running automated processes. In a first embodiment, the method comprises the steps of providing at least one computer and providing at least one virtual user on the at least one computer which interacts with applications and/or documents to execute at least one automated process.

Preferably, the method further comprises the step of providing a database accessible by the at least one automated process and wherein the at least one virtual user is configured to execute the at least one automated process utilising data stored in the database.

Preferably, the method further comprises the step of hosting at least one virtual machine on the least one computer and wherein the at least one virtual machine is configured to provide the at least one virtual user to execute the at least one automated process utilising data stored in the database.

Preferably, the method further comprises the steps of hosting at least one virtual machine on the at least one computer, providing at least one database server and at least one application server, providing, with the application server, instructions to the at least one virtual machine to execute the at least one automated process, providing the at least one virtual user by the at least one virtual machine and executing the at least one automated process on the at least one virtual user according to the provided instructions utilising data stored in the database, wherein the at least one virtual machine is communicatively coupled with the at least one database server and the at least one application server.

Preferably, the at least one database server, at least one application server and at least one computer form a first set and the method further comprises the steps of providing a second set of at least one database server, at least one application server and at least one computer, wherein the first and second sets are communicatively coupled such that the at least one application server of each set and the at least one database of each set may communicate with each other, configuring at least one application server of one of the sets to provide instructions to the at least one virtual machine of at least one of the first and second sets and mirroring the at least one database server of the first set on the at least one database server of the second set.

Preferably, the at least one application server of at least one set manages the connection of the at least one virtual machine of the at least one set to the one or more database servers of the at least one set.

Preferably, the at least one application server of the at least one set contains database server credentials for securely accessing the at least one database server of the at least one set.

Preferably, the at least one virtual machine/virtual user comprises more than one virtual machine/virtual user, and the virtual machines/virtual users are grouped into at least one resource pool.

Preferably, the second set is inactive until activated upon failure of the first set.

Preferably, remote access to the at least one virtual machine is limited to providing instructions to execute automated processes, shutdown the at least one virtual machine, restart the at least one virtual machine and start up the at least one virtual machine.

Preferably, the at least one virtual machine comprises a standard end-user desktop operating system.

In a third aspect of the invention there is provided a method for running automated processes. The method comprises the steps of providing a first computer communicatively coupled to a database, the database stored on one of the first computer, a second computer, and a database server, configuring the first computer to execute an automated process and executing the automated process using data stored in the database.

DETAILED DESCRIPTION OF THE INVENTION

Figure 1:
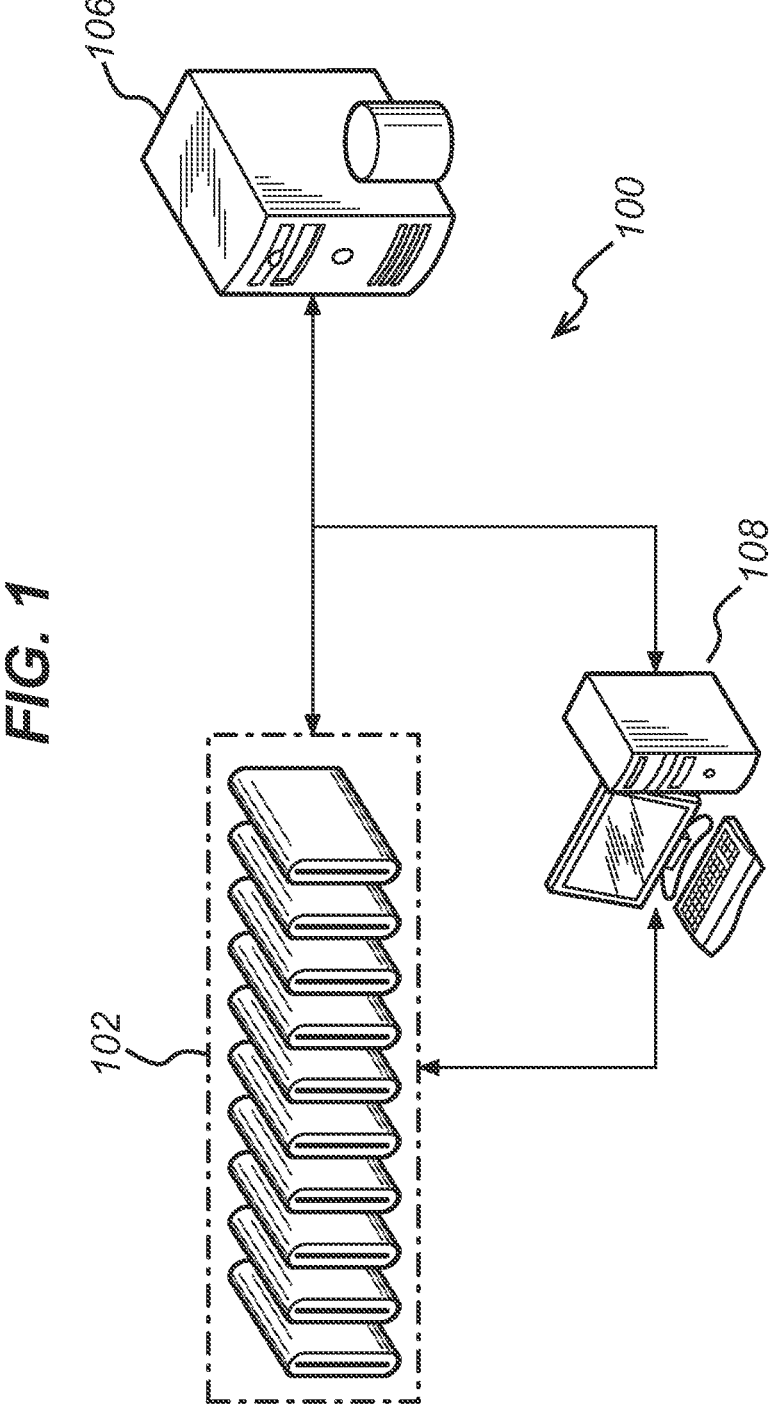
FIG. 1 is a schematic of an implementation of a system according to the present invention.

The present invention will now be described with reference to the figures.

A system for automating processes, according to a first embodiment of the present invention, comprises a computer which may be configured to provide at least one virtual user. A virtual user interacts with elements on the same or different computer, such as applications and/or documents, to execute automated processes. The automated process executed by the virtual user may be a process currently carried out by a human user, e.g. transferring data between two incompatible software applications, or any of the examples of tasks carried out by human users previously described. A virtual user is, for example, an automated system, such as that described herein, which can be used to carry out the automated processes. For example, in the previously described example of a bank, one or more employees may be replaced by one or more virtual users which interact with the account profiles of customers with insufficient funds to make a payment. The virtual users review the account profiles of each customer by taking into account the various parameters that may be associated with such an account, and making a decision to either return or process the payments according to a predefined set of rules for doing do. This arrangement has the advantages of i) freeing up employees to be used in other roles, ii) providing consistency and accuracy across the decisions which are made and iii) processing the payments faster. As will be described below, the use of one or more virtual users also has the advantages of improved security, increased scalability and lower costs, among others.

Within the system, the at least one virtual user is configured to interact with applications and/or files to execute at least one automated process. The system for automating processes may be in communication with a database which holds data utilised in the automated processes. The database may be stored on the computer configured to execute the automated processes, or may be stored on a second computer or a dedicated database server. Throughout this specification, the term "server" should be considered to encompass both software and dedicated hardware servers, unless otherwise explicitly stated. The computer may itself be configured to execute the automated processes (i.e. it may provide the one or more virtual users), or may be configured to host one or more virtual machines which provide the one or more virtual users, i.e. one virtual machine provides one or more virtual users each of which interacts with elements present within the virtual machine or a different computer or virtual machine, such as applications and/or documents, to execute automated processes. Implementing virtual users within virtual machines enables multiple virtual users to be provided on the same hardware and allows for improved scalability as virtual machines can be more easily added, removed and configured than dedicated hardware. The system may also further include a terminal which can be used to configure and run the automated processes.

FIG. 1 is a schematic of a system implemented according to one variation of the first embodiment of the present invention in which at least one virtual machine is utilised. The system 100 comprises at least one computer which is configured to host the at least one virtual machine 102, a database server 106 and a terminal 108.

The virtual machines 102 provide virtual users which are configured to execute one or more automated processes using applications stored on the virtual machines and data stored on the database server 106. The execution of the automated processes on the virtual machines 102 by the virtual users may be controlled by the terminal 108. The terminal 108 may be configured to allow the definition of schedules defining the processes to be executed by the virtual users on the virtual machines 102.

The system may also include an application server. The application server may be hosted on the same physical computer as the virtual machines and/or the database, or may be hosted on a separate dedicated computer or server. The function of the application server will be described in more detail with reference to the following figures.

Figure 2:
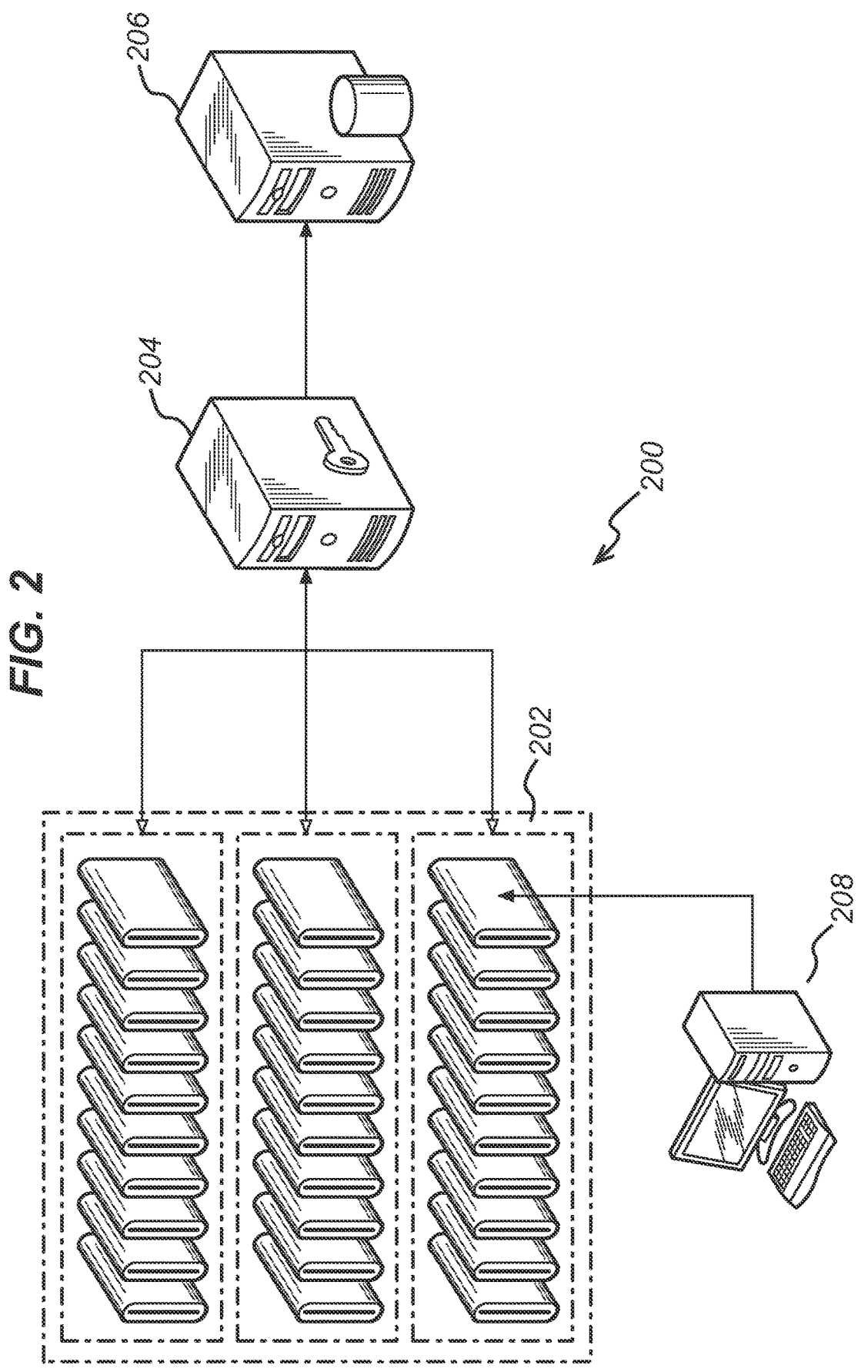
FIG. 2 is a schematic of an alternative implementation of a system according to the present invention.

FIG. 2 is a schematic of a system 200 implemented according to a second embodiment of the present invention. The system 200 comprises a plurality of virtual machines 202, which provide a plurality of virtual users, an application server 204 and a database. The database may be hosted on a database server 206 in a preferred embodiment which is discussed below. The application server 204 may be a single physical server or a virtual server. Similarly, the database server 206 may be a single physical server or a virtual server.

The virtual machines 202, application server 204 and database server 206 are networked such that they may communicate with each other. The system 200 is configured such that the application server 204 allocates automated processes to the virtual machines 202 for execution by the one or more virtual users. The automated processes allocated by the application server 204 and executed by virtual users on the virtual machines 202 are processes defined by a user to be carried out on data present in one or more of software systems, databases, stored files or documents.

In the second embodiment, the virtual machines 202 are persistent virtualised instances of standard end-user operating systems, preferably Microsoft Windows®. Preferably, the virtual machines 202 exist on one or more secure servers which cannot be accessed, physically or remotely, without appropriate security clearance or authentication. The servers on which the virtual machines exist preferably run Type 1 hypervisors such as VMware ESX®; however, it will be appreciated that any suitable arrangement of hardware and software permitting the creation and running of virtual machines may be used. The virtual machines 202 are headless in the sense that they do not have a connected monitor or similar output device which displays a graphical output. By running multiple virtual machines 202, multiple virtual users may execute multiple automated processes simultaneously on the same hardware to improve productivity or serve multiple external users concurrently.

Preferably, remote access to the virtual machines 202 is restricted once they have been configured. The ability to remotely restart, shutdown and start up the virtual machines 202 is the only remote access required except for the capability for the at least one application server 204 to provide instructions to the virtual machines 202 and thus the virtual users to execute a process. Such an arrangement provides additional security to the system, since it is not possible to remotely interfere with the automated processes running on the virtual machines 202. This arrangement also provides additional security over the use of operational staff to carry out the processes which are automated by the virtual users on the virtual machines 202. It is not possible to maliciously or accidentally carry out the process in a different manner for different data without the correct authorisation, and the authorisation does not need to be provided to anyone who is not administering the system.

Where passwords are required to access applications essential to the automated processes being executed by the virtual users on the virtual machines 202, the passwords are stored in an encrypted credential store. Preferably, the credential store will be encrypted using Triple Data Encryption Standard (DES) and be stored on the database server, although any suitable encryption standard can be used and the credential store may be stored in any suitable location, such as on the application server or the virtual machine. The automated processes can be configured such that the passwords stored in the credential store are periodically updated to a secure, random password which is not known outside the system 200. Since the passwords protecting applications which have access to sensitive information such as customer information, bank details etc. are stored in an encrypted credential store on the virtual machines 202 and are not provided to operational staff, the security of these systems and applications and the information contained within is greatly improved. Requests for credentials from the credential store may also be authenticated on the basis of the ID of the virtual machine 202 and the ID of the process requesting the credential. This ensures that only authorized machines, virtual users and processes can be granted access to the information within the credential store. The virtual machines 202 may authenticate with application servers 204 using a Windows Credential Provider.

System administrators and users can, optionally, be authenticated using Microsoft Active Directory, linking their roles and permissions to an existing domain structure.

The application server 204 is configured to manage the connections of the virtual machines 202 to the database server 206. The application server 204 holds the database server security credentials, such as for Windows Authentication or Structured Query Language (SQL) Authentication, and behaves as a secure connection proxy for the database such that all of the virtual machines 202 communicate with the application server 204 and the application server 204 communicates securely with the database server 206 on behalf of the virtual machines 202. This arrangement allows the application server 204 to be the only place within the system 200 which needs to store the database server security credentials with the correct authentication to access and modify the data stored on the database server 206. Since the database server security credentials are only stored in one place within the system 200, the security of the system is improved over the storage of security credentials on each virtual machine 202 and also provides improved security over current multiple user multiple password systems.

The database server 206 is preferably a SQL Server database. The database server 206 holds one or more SQL Server databases which hold a repository of processes and objects related to the automated processes, user credentials, audit information, process logs and workflow configuration and scheduling information for the automated processes. Multiple SQL schema can be present on one database server 206, permitting different virtual users on the virtual machines 202 to execute different automated processes referring to different sets of information stored within the database of the database server 206.

The database server 206 also stores work queues. Work queues enable data requiring processing to be stored in order to enable distribution across the system of the processes to be executed by the virtual users on the virtual machines 202. Process stage information, which is simply a number, for example, indicating the current stage of a process enabling the process to be paused and resumed, and exception details are also stored in the work queues. Data are populated into the work queues either via direct database population, APIs or by the virtual machines or virtual users accessing an existing workflow system or some other information store such as a spreadsheet, email or other file mechanism and using the queue to hold a reference to each item worked. For example, a process to be automated may involve reading data from one or more files and carrying out an action in response to or on the data. Once the data has been read from the one or more files, it may be stored in a work queue such that the virtual users on virtual machines 202 can take data from the work queue with or on which to carry out a process.

Work queues can also be encrypted, providing a further layer of security for the data within the work queue. The data which is stored in work queues may include, for example, personal details of customers including bank details, addresses, birth dates etc., or many other examples of sensitive information. Hence, such security is important in some embodiments.

Figure 3:
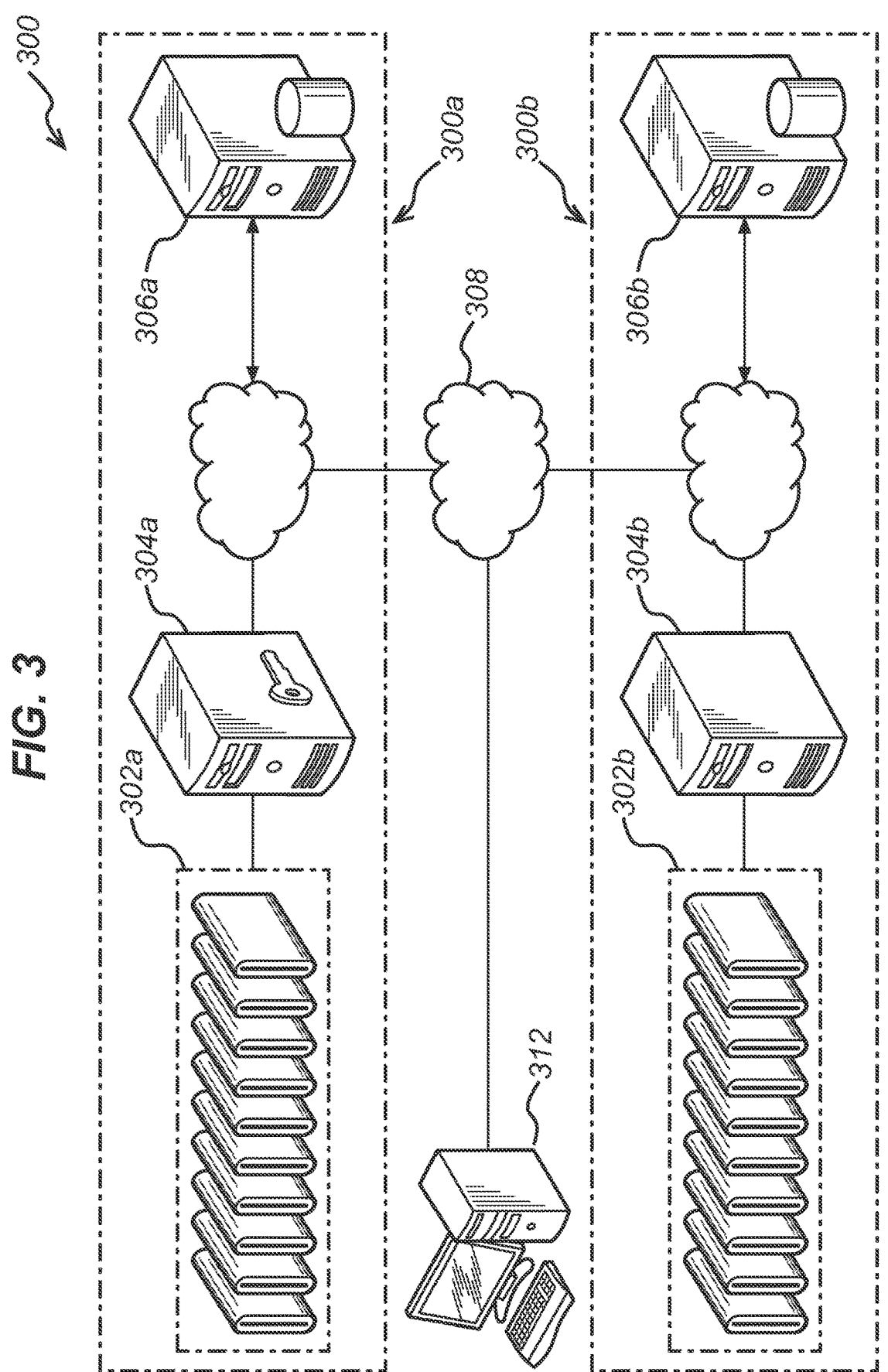
FIG. 3 is a schematic of an alternative implementation of a system according to the present invention.

The terminal 208 is used to define the automated processes to be run on system 200, as described in relation to FIG. 3, and to view the virtual machines 202. The terminal 208 may also be used to define schedules of automated processes to be carried out by the virtual users on the virtual machines 202 and for administrators to view, start and stop processes being executed by the virtual users on the virtual machines 202 manually. The processes may be started and stopped outside of the scheduling system using the terminal 208.

In the second embodiment, the application server 204 is configured to carry out defined schedules by providing instruction(s) to the virtual machines 202 to execute individual processes.

Alternatively to the application server 204 controlling both the scheduling of processes and managing the connections of the virtual machines 202 to the database server 206. The application server 204 may only be responsible for the scheduling of processes, and a separate application or server may be configured to manage the connections of the virtual machines 202 to the database server 206.

Carrying out processes, which are presently typically carried out by operational staff, on the system described herein allows the steps of the process to be carried out consistently and without error, and also allows the process steps to be recorded. Recorded process steps can be analysed to improve the speed at which processes are carried out and also to improve the processes themselves.

FIG. 3 depicts a system 300 in accordance with a third embodiment of the invention. The systems 300*a* and 300*b* each consist of virtual machines 302*a* and 302*b*, on which virtual users are provided, application servers 304*a* and 304*b* and database servers 306*a* and 306*b*. As previously discussed in relation to the second embodiment, the application servers 304*a* and 304*b* and database servers 306*a* and 306*b* may be physical servers or virtual servers or a combination thereof, they may be single servers or multiple servers and set up in any way previously described. Network 308 connects the application servers 304*a* and 304*b* and database servers 306*a* and 306*b*. Network 308 may be a local area network (LAN) or a wide area network (WAN). The systems 300*a* and 300*b* may be disposed at the same site or at different sites.

Preferably, the scheduling and allocation of processes to the virtual users on virtual machines 302*a* and 302*b* across both systems 300*a* and 300*b* is carried out by one of the application servers 304*a* and 304*b*. In this case, if one of the application servers 304*a* and 304*b* fails, or one of the systems 300*a* and 300*b* fails, the scheduling and allocation of automated processes can be taken over by the other of one of the application servers 304*a* and 304*b*, if necessary. In this way, execution of automated processes can continue on at least one of the sets of virtual machines 302*a* and 302*b*.

Alternatively, a master application server may be responsible for the scheduling and allocating of processes to virtual users on virtual machines 302*a* and 302*b* across both systems 300*a* and 300*b*. This arrangement also allows the execution of processes by the virtual users to continue on at least one set of the virtual machines 302*a* and 302*b* should one of the systems 300*a* and 300*b* or one of the application servers 304*a* and 304*b* fail.

Figure 4:
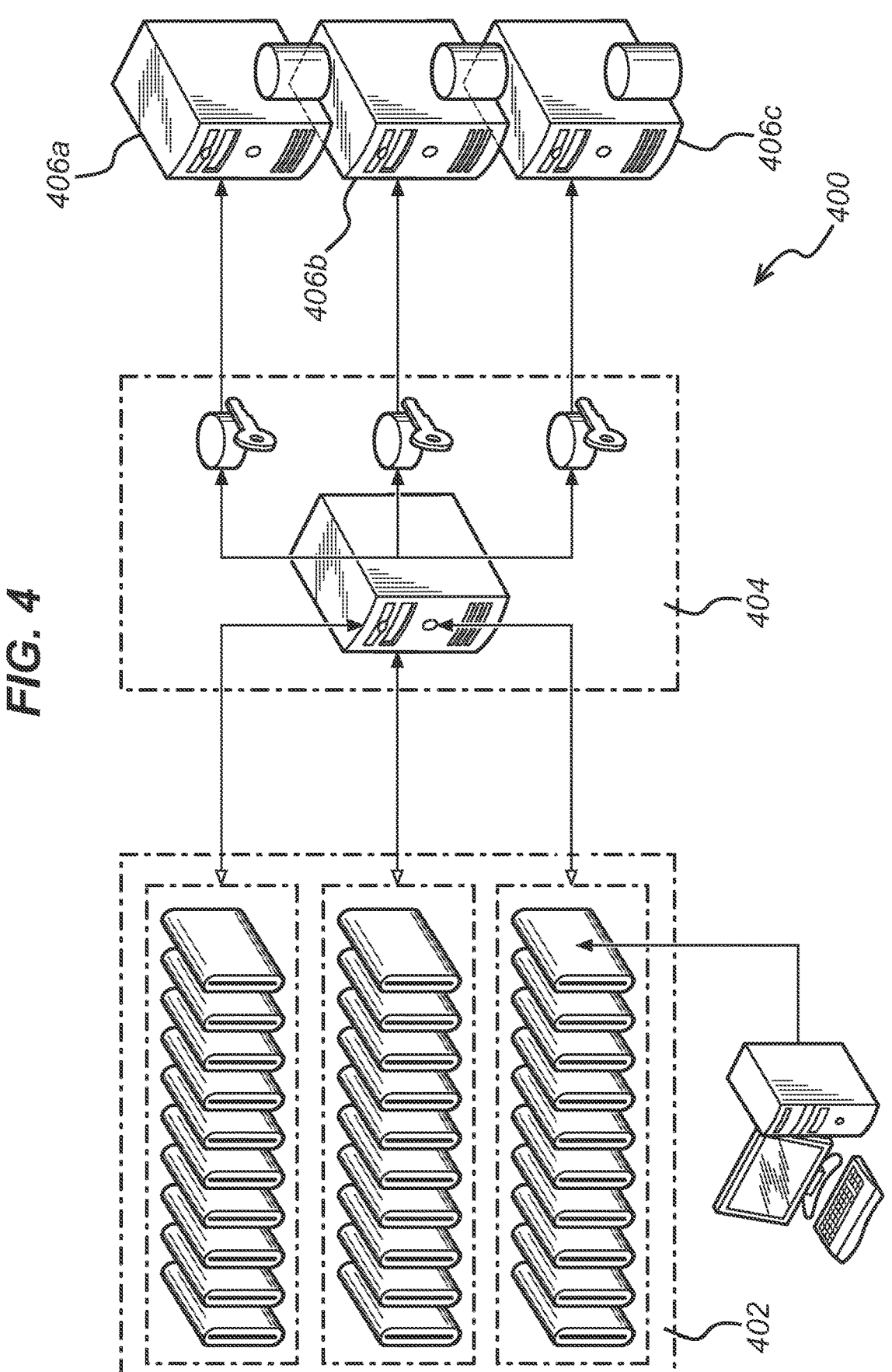
FIG. 4 is a schematic of an alternative implementation of a system comprising multiple database servers according to the present invention.

The database server 306*b* is a mirror of database server 306*a*. This configuration caters for the failure of an application server 304*a* or 304*b* or a database server 306*a* or 306*b*, or both. If systems 300*a* and 300*b* are located at different sites, then this configuration will enable the execution of the automated processes to continue at the second site should one of the sites fail, for example, due to a power outage. Alternatively, system 300*b* may be located at the same site or a separate site and be initially inactive, becoming active upon a failure at the first site. In the event of a failure, the application server 304*a* or 304*b* of the functioning set adjusts the allocation of processes. In the case that a master application server is responsible for the scheduling and allocation of processes, the master application server may adjust the allocation of processes, FIG. 4 depicts an alternative to the second and third embodiments in which multiple database servers 206 may be present in the system. In the following example, three database servers are discussed, but this is merely exemplary. The database servers 406*a*, 406*b* and 406*c* may each hold different databases and the applications server 404 may be associated with all of the database servers 406*a*, 406*b* and 406*c*. Alternatively, there may be multiple application servers 404 and each application server may hold the credentials for all of the database servers 406*a*, 406*b* and 406*c*. In a further alternative, the number of application servers 404 may equal the number of database servers 406*a*, 406*b* and 406*c* where each application server 404 may hold the credentials for only one database 406*a*, 406*b* or 406*c*. Such an arrangement of multiple databases allows for multiple distinct sets of automated processes to be run using the same virtual machines 402 while referencing different databases.

Where multiple database servers 406*a*, 406*b* and 406*c* are used, the database servers 40 may be configured to hold the same database, with one or more of the database servers 206 being a mirror of a master database server. This arrangement provides redundancy and should one of the servers stop functioning, allows the processes executed by the virtual users on the virtual machines 202 to continue.

Figure 5:
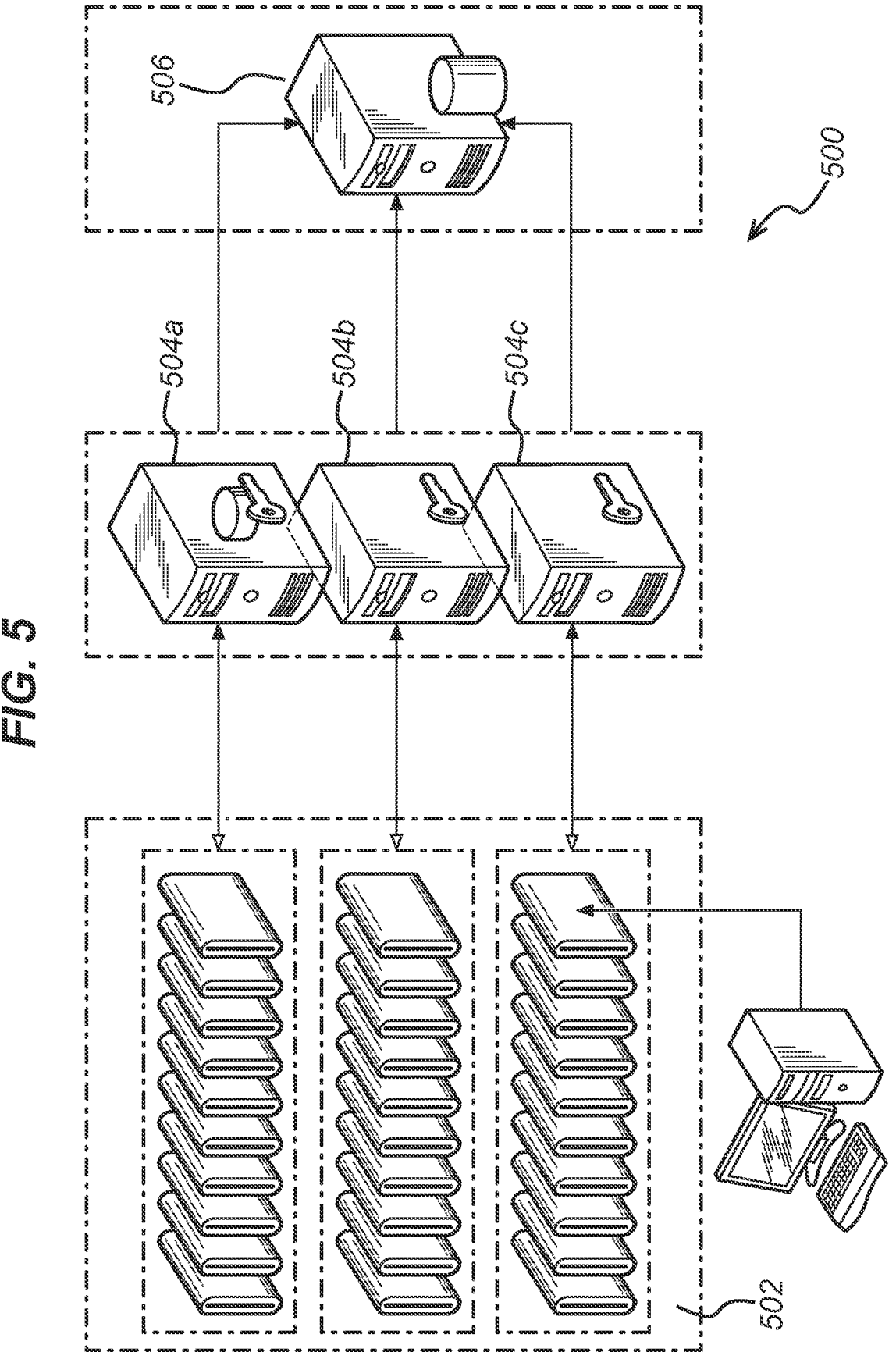
FIG. 5 is a schematic of an alternative implementation of a system comprising multiple application servers according to the present invention.

FIG. 5 depicts a further alternative to the above described second and third embodiments, in which there may be more than one application server 204. The application servers 504*a*, 504*b* and 504*c* may all be dedicated servers, all virtual servers or a combination thereof. In an embodiment in which there are multiple application servers 204, one server may be nominated as a master scheduler server, which is in charge of carrying out the scheduling and issuing instructions to the virtual machines 202 to execute processes. Each of the application servers 204 maintains a duplicate set of credentials for authentication with the database server 206. Such an arrangement of the application servers 504*a*, 504*b* and 504*c* creates redundancy in the system which provides a failsafe should one or two of the application servers 504*a*, 504*b* and 504*c* fail, allowing the automated processes being executed by virtual users on virtual machines 502 to continue. It will be appreciated that the number of application servers in such an arrangement may be any number greater than two and that three are depicted here as an example.

Figure 6:
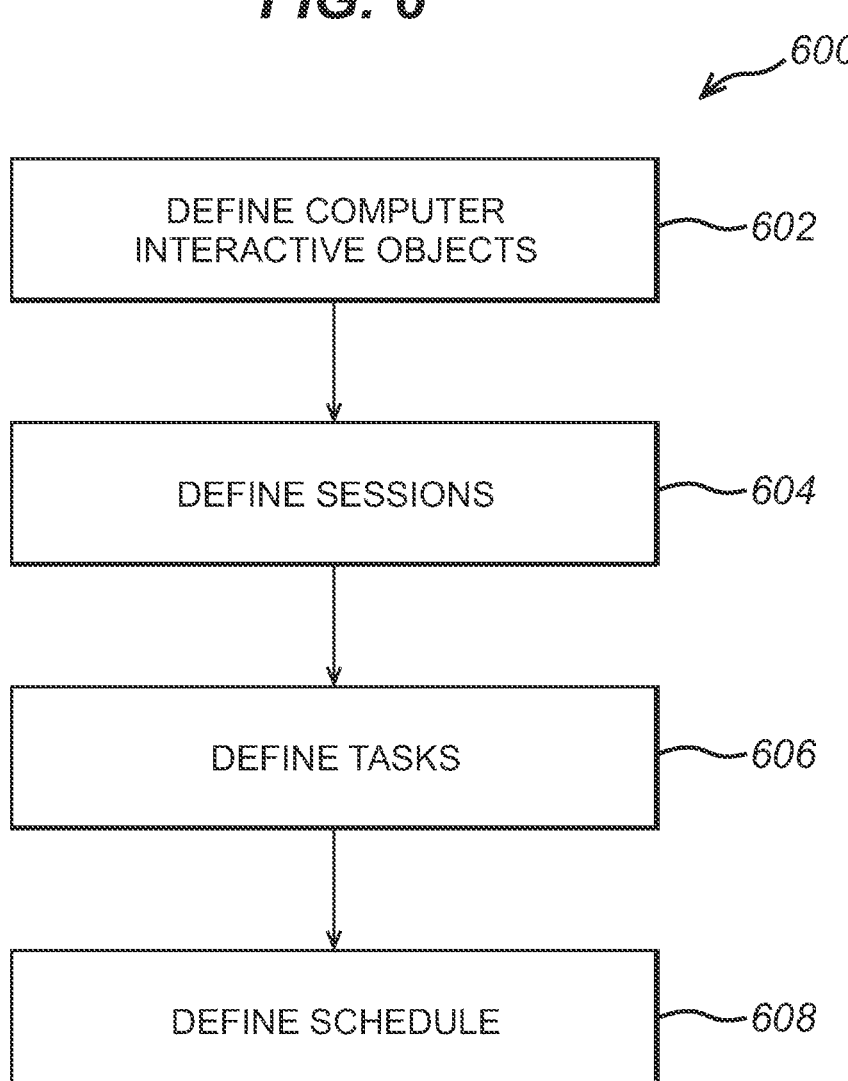
FIG. 6 is a flow chart depicting a method of defining and scheduling the processes to be automated.

FIG. 6 shows a flow chart 600 of the process of defining the automated processes which are to be executed by the virtual users on the virtual machines 202.

The automated processes carried out by the system 100, 200, 300, 400 or 500 may involve getting information from or inputting information into software applications. For software applications without an existing, dedicated API, enabling interaction with other software applications and the automated processes is achieved by creating computer interactive objects which may be accessed by the automated processes to both input and output information from the software applications. This process is carried out in step 602 according to the following methods.

If the existing software application implements accessibility features for example, Java applications and applets that implement the Java Accessibility API or Windows applications which implement the Microsoft Active Accessibility API or IAccessible2, it is possible to capture the accessibility interface definitions and use these to create computer interactive objects.

Alternatively, if the application is a HyperText Markup Language (HTML) web application or document, it is possible to parse the HTML of the web page to identify HTML elements and use these definitions to create computer interactive objects linked to the web application which may be accessed by the user defined processes.

A preferred HTML parser uses the Document Object Model (DOM) implementation provided by Microsoft Internet Explorer's MSHTML IHTMLDocument2 interface. In an embodiment, this is combined with attributes of the graphical user interface (GUI) window in which the HTML web application or document is displayed, the uniform resource locator (URL) of the HTML web application or document and the HTML path in order to create unique identifiers for the computer interactive objects.

Computer interactive objects may also be defined for software applications with existing exposed APIs, such as using Window objects, Dynamic Data Exchange (DDE), High Level Language Application Programming Interface (HLLAPI) interfaces for mainframe terminals and hooking COM components, such that they are accessible by the automated processes in the same manner as the computer interactive objects defined for software applications without existing APIs. The presentation layer, i.e. the user interface as it is presented on the screen, can also be used to define computer interactive objects and to interpret the controls sent to an application. This may be achieved by using the presentation technology: underlying components within that application and the application's host operating system that are responsible for communicating and drawing the windows and controls that a user sees and which handles the user's interactions with them, e.g. the underlying control, mouse and keyboard messages between Windows and the application and the applications' COM components that manage the controls and handle the users interactions.

The previously discussed methods of creating computer interactive objects linked to software applications which may be accessed by the user defined processes rely upon specific features of the implementation of the software. However, these features are not always present. Thin-client applications may run on a separate computer system to the system with which a user interacts with keyboard and mouse input and graphical output, providing only a graphical user interface (GUI) at the user's system. In the system of the present invention, the automated processes may need to interact with a thin client application and, since the only component of the thin-client application which is present on the system on which the automated process is executed is the GUI of the thin client application, the only possible interface from which to create a computer interactive object is the GUI.

A computer interactive object relating to the GUI of an application, such as in the case of a thin-client application, can be created, according to an embodiment of the invention, by defining regions of the GUI to be interpreted as input or output fields. If the defined region is an output field, then the contents of the field are interpreted by identifying the font used in the defined region, identifying the characters of the text in that defined region by comparing them to characters of the identified font and outputting the identified characters as a string, which can be interpreted on the computer system. The method of interpreting text displayed in the GUI is discussed below, in relation to FIG. 7.

In step 604, once computer interactive objects have been defined for the software applications required for use in the automated processes, sessions are defined to make use of the defined computer interactive objects as well as database information, stored files and documents. Sessions are the pre-defined individual processes run by the virtual users on the virtual machines 202. The actions which make up a session may consist of locating a file, reading in data from the file and placing the data in a work queue, for example.

In step 606, the sessions defined in step 604 are grouped into tasks. Tasks are collections of sessions which are grouped together and executed in parallel. Within a task, individual sessions are allocated to a particular virtual machine 202 or resource pool, such that when the task is executed, the application server 204 transmits instructions to the virtual machines 202 or resource pool to carry out the session or sessions allocated to them.

A resource pool is a grouping of a set of virtual users/virtual machines 202 into a pool which can be addressed as a combined unit. Externally, a resource pool appears and behaves like an individual virtual user/virtual machine 202 in that it can be allocated processes by the application server 204 according to the defined schedule. Internally, when a resource pool is instructed to execute a process, it does so by automatically selecting one of the virtual users/virtual machines 202 which belong to the pool.

A resource pool has a controller which takes the instructions for the whole resource pool. The controller may be a virtual user/virtual machine 202 within the resource pool, or may be the application server 204.

In the case that a virtual user/virtual machine 202 is controller of a resource pool, rather than an application server 204 being the controller, all virtual users/virtual machines 202 within the resource pool are addressable by the application server 204. The virtual users/virtual machines 202 which are not the controller forward incoming messages from the application server 204 to the controller and forward responses from the controller to the application server 204. The identity of the virtual user/virtual machine 202 acting as the controller is recorded in a database stored on the database server 206, with a timestamp and is updated by the controller via the application server 204. In the case that this database record goes stale, indicating that the virtual user/virtual machine 202 acting as the controller has ceased to act as the controller such as when it has experienced an error and failed, another virtual user/virtual machine 202 may take over as the controller of the resource pool. The database record eliminates concurrency issues since two virtual users/virtual machines 202 cannot update the database record simultaneously, therefore two virtual users/virtual machines 202 cannot simultaneously attempt to take over as controller of the resource pool.

In the event that the controller ceases to function, the other virtual users/virtual machines 202 in the resource pool will be able to detect this quickly, since they will no longer be able to communicate with the controller directly.

The arrangement of virtual users/virtual machines 202 into resource pools has the advantage of providing both redundancy in the case of failure and scalability for coping with increased demand. By allocating sessions within tasks to resource pools, rather than the individual virtual users/ virtual machines 202, if one of the virtual machines 202 or virtual users were to fail, another virtual user could execute the session in its place without user intervention. Allocation of sessions to resource pools also enables the system to cope with increased demand, by spreading out the required work to more of the virtual users on virtual machines 202 when it is required. It is also possible to add more virtual machines 202 and virtual users to a resource pool, increasing the capacity of the resource pool if it is required.

In step 608, the tasks defined in step 606 are placed in a schedule. A schedule contains a tree of tasks which are performed sequentially. Within a schedule, each task defines the next task or activity to be performed upon either successful completion of the task or an exception being raised. The time and date on which schedules are run is also defined. For example, a schedule can be defined to run only once, at a given date and time, or at varied intervals. This can be done on a calendar type basis, for example only running a particular schedule on working days and within working hours. Schedules may also run indefinitely from a given start point, or may be retired at a particular time and date.

In one embodiment of the invention, it is possible to view a timetable which displays the times at which schedules are defined to run within a given time period using the terminal.

In one embodiment of the invention, it is possible for processes to be executed outside of the scheduling system; for example, by manual control by a user or by an external system. The processes may be accessible to external systems via an API. For example, when an automated process is required on-demand or in response to a particular action, an API call may place the process in the work queue. By making the processes externally accessible, the system can be used in environments which require the processes to be executed on something other than a pre-defined schedule. For example, the self-service check in kiosks discussed above need only to execute the process required to check a patient in (and any further actions which may follow from a patient checking in) when a patient checks in.

Upon completion of a schedule, whether because a defined schedule has run its course and has ended, because the schedule was retired as defined, or because an error occurred, for example, the results of a schedule are saved to reports for later viewing.

The scheduling, the definition of computer interactive objects and the definition of processes means that tasks are automated at a high level. This results in less training being required for non-IT specific people to configure the system to automate processes and allows for a rapid response to changing requirements while avoiding traditional enterprise development cycles.

Figure 7:
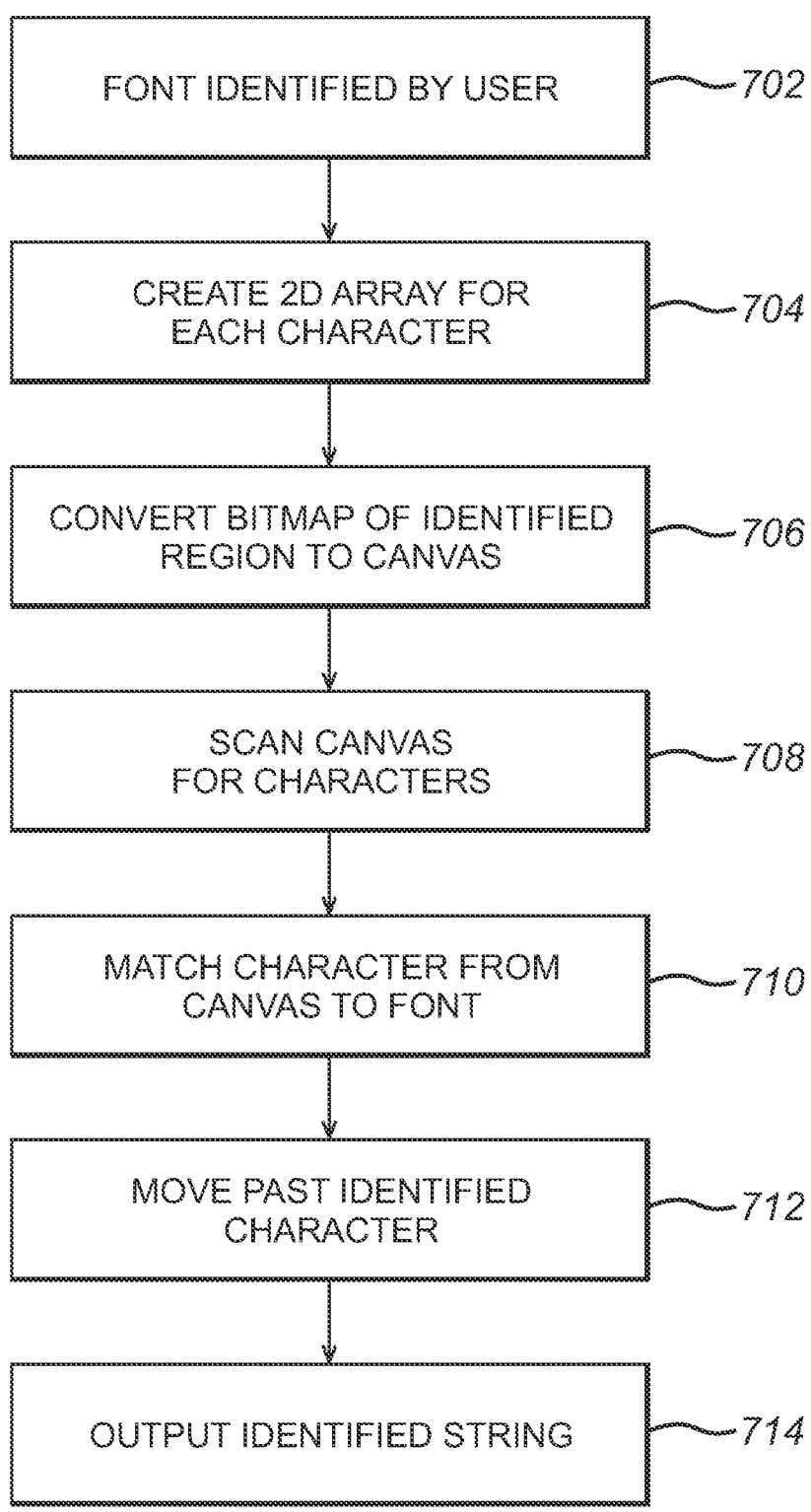
FIG. 7 is a flow chart depicting a method of identifying characters in a designated area of a graphical user interface.

FIG. 7 is a flow chart which depicts the method 700 used to carry out the process of interpreting text in defined regions. At step 702, the font used by the application is identified by a user. The user in this instance may be the person configuring the system and computer interactive objects for use in executing the automated processes, for example. Typically, the fonts used in the user interface of an application are operating system dependent. At step 704, a two dimensional pixel representation is generated for each character in the font. Preferably, the two dimensional pixel representation is an array of Boolean values, with each element in the array representing an individual pixel and the value representing whether or not the pixel is used by the character. Preferably, every array has the same number of vertical elements. For example, the array representing a full stop extends as far down as the lowest hanging character and as high as the tallest character. The character arrays are preferably stored in Extensible Mark-up Language (XML) format, but can be stored in any other suitable manner.

At step 706, a bitmap of the defined region is converted into the same two-dimensional pixel representation as that used for the font characters. This involves cleaning the bitmap so that any pixels which do not form part of the font are discarded. This is carried out by assuming that all of the pixels of the bitmap are "paper", i.e. the pixel is determined to be part of the background on which the text is set. As the bitmap is scanned, pixels which match a specified foreground colour are marked as "ink", i.e. they form part of the text. The result of this conversion is a "canvas" which represents the characters displayed in the defined region of the GUI. As previously described, this representation is preferably a two-dimensional array of Boolean values.

Alternatively, the bitmap of the defined region may be filtered to near 16 bits such that colours are replaced by a 16-bit colour palette except for a specified background colour, which is left at its 32 bit value. For each row of the filtered image the dominant colour of the row is found. If the dominant colour is not the background colour, all pixels on the row of the dominant colour will be replaced by with the background colour. Using this bitmap, the canvas is produced by assuming that all of the pixels are ink and scanning through each pixel, marking pixels as paper if they match the specified background colour.

At step 708 the canvas is scanned for characters until a character is found. In a first method of scanning the canvas, the canvas is trimmed such that there are no blank columns (i.e. columns only containing paper) before or after any columns containing ink and such that the blank rows above and below the rows containing ink match the maximum whitespace above and below characters specified in the font.

At step 710 the canvas is matched against a font by comparing the mask, which is the arrangement of ink in the character disregarding any paper, against the mask of the canvas, of a font character. The canvas is tested from the top left to the bottom right, going vertically down first. It will be appreciated that other suitable methods of scanning the canvas may also be used. For each point in the canvas, each character in the font is tested to see if the ink defined in the character mask is represented as ink on canvas. If multiple characters match, the character with the most ink is chosen. If characters have already been found, any subsequent matches which start on a different row are disregarded. The spacing between characters is estimated according to the typical spacing between characters defined in the font.

At step 712, the process moves past the identified character. This may be done by simply continuing to scan from a position beyond the identified character, or the identified character ink may be deleted from the canvas to prevent the character from being identified twice or from interfering with the identification of other characters. If the scanning process has not reached the end of the canvas after moving past the identified carrier, the scanning process resumes until the next character is found or until the end of the canvas is reached. If the end of the canvas has been reached, at step 714 the interpreted text is output.

It will be appreciated that this description is by way of example only; alterations and modifications may be made to the described embodiment without departing from the scope of the invention as defined in the claims.

What is claimed is:

1. A system for running automated processes comprising:
   a first computer configured to host a virtual machine that interacts with an application according to at least one automated process, the at least one automated process defined by creating one or more computer interactive objects corresponding to a graphical user interface of the application;

a first database server; and a first application server, wherein:

the virtual machine is communicatively coupled with the first database server and the first application server;

the first application server is configured to provide instructions to the virtual machine to execute the at least one automated processes according to a schedule, wherein the schedule comprises individual sessions grouped into one or more tasks, wherein the individual sessions are:

defined as individual processes to be allocated to a particular virtual machine or resource pool, a resource pool being a set of virtual machines that can be addressed as a combined unit;

defined to make use of the one or more computer interactive objects, and;

for a given task, configured to execute in parallel, and wherein the schedule defines a tree of the one or more tasks to be performed sequentially;

the virtual machine is configured to run an instance of the application having a software interface comprising the one or more computer interactive objects corresponding to the graphical user interface of the application, the software interface located on the virtual machine; and the virtual machine is configured to execute the at least one automated process according to the provided instructions utilizing data stored in the first database server.

2. The system of claim 1, wherein the first database server, first application server and first computer form a first set, the system further comprising a second set comprising a second database server, a second application server and a second computer, wherein:

the first and second sets are communicatively coupled such that the first application server and the second application server, and the first database server and the second database server communicate with each other;

the first application server or the second application server is configured to provide instructions to virtual machine of at least one of the first and second sets; and the second database server is a mirror of the first database server.

3. The system of claim 2, wherein the first application server is configured to manage a connection of the virtual machine of the first set to the first database server, or wherein the second application server is configured to manage a connection of the virtual machine of the second set to the second database server.

4. The system of claim 2, wherein the first application server contains database server credentials for securely accessing the first database server, or wherein the second application server contains database server credentials for securely accessing the second database server.

5. The system of claim 2, wherein the second set is inactive until activated upon failure of the first set.

6. The system of claim 1, wherein the first computer is configured to host a plurality of virtual machines, wherein the plurality of virtual machines are grouped into at least one resource pool.

7. The system of claim 1, wherein the virtual machine is configured such that remote access to the virtual machine is limited to providing instructions to execute automated processes, shutdown the virtual machine, restart the virtual machine and start up the virtual machine.

8. The system of claim 1, wherein the virtual machine is further configured to carry out the at least one automated process by interpreting HTML elements within a HTML document.

9. The system of claim 1, wherein the virtual machine is configured to carry out the at least one automated process by identifying a font used by text in a defined region of a user interface and identifying characters of the text in the defined region of the user interface using the identified font.

10. The system of claim 1, wherein the at least one automated process is defined by a user and configured to be carried using data from one or more of software systems, databases or stored files or documents.

11. The system of claim 1, wherein at least one password required to access specific software applications is stored within an encrypted credential store on the first database server.

12. The system of claim 11, wherein the virtual machine is configured to update the at least one password stored within the encrypted credential store to a random password not known outside the system.

13. The system of claim 1, wherein the software interface is one or more of: an accessibility interface, an exposed Application Program Interface (API), a presentation technology of an operating system, and HyperText Markup Language (HTML) elements within a HTML document.

14. A method of running automated processes comprising:

providing a first computer;

providing a first database server and a first application server;

defining at least one automated process by creating one or more computer interactive objects corresponding to a graphical user interface of an application;

hosting a virtual machine on the first computer that interacts with an application according to the at least one automated process, wherein the virtual machine is communicatively coupled with the first database server and the first application server and wherein the virtual machine is configured to run an instance of the application, the application having a software interface comprising the one or more computer interactive objects corresponding to the graphical user interface of the application, the software interface located on the virtual machine;

providing, with the first application server, instructions to the virtual machine to execute the at least one automated process according to a schedule, wherein the schedule comprises individual sessions grouped into one or more tasks, wherein the individual sessions are:

defined as individual processes to be allocated to a particular virtual machine or resource pool, a resource pool being a set of virtual machines that can be addressed as a combined unit;

defined to make use of the one or more computer interactive objects, and;

for a given task, configured to execute in parallel, and wherein the schedule defines a tree of the one or more tasks to be performed sequentially; and executing the at least one automated process according to the provided instructions utilizing data stored in the first database server.

15. The method of claim 14, wherein the first database server, first application server and first computer form a first set and wherein the method further comprises:

providing a second set of a second database server, a second application server and a second computer, wherein the first and second sets are communicatively coupled such that the first application server and the second application server and the first database and the second database may communicate with each other;

configuring first application server or the second application server to provide instructions to the virtual machine of at least one of the first and second sets; and mirroring the first database server on the second database server.

16. The method of claim 15, wherein first application server manages a connection of the virtual machine of the first set to the first database server, or wherein the second application server manages a connection of the virtual machine of the second set to the second database server.

17. The method of claim 15, wherein the first application server of the first set contains database server credentials for securely accessing the first database server, or wherein the second application server of the second set contains database server credentials for securely accessing the second database server.

18. The method of claim 15, wherein the first computer hosts a plurality of virtual machines, wherein the plurality of virtual machines are grouped into at least one resource pool.

19. The method of claim 15, wherein the second set is inactive until activated upon failure of the first set.

20. The method of claim 15, wherein remote access to the virtual machine is limited to providing instructions to execute automated processes, shutdown the virtual machine, restart the virtual machine and start up the virtual machine.

21. The method of claim 15 wherein the virtual machine comprises a standard end-user desktop operating system.

22. The method of claim 14, wherein the software interface is one or more of: an accessibility interface, an exposed Application Program Interface (API), a presentation technology of an operating system, and HyperText Markup Language (HTML) elements within a HTML document.

\* \* \* \* \*